Patented Dec. 22, 1942

2,305,663

UNITED STATES PATENT OFFICE 2,305,663

METHOD FOR PREPARING METHACRYLIC ACID ESTERS

Ludwig Beer, Burghausen, Upper Bavaria, Germany, and Paul Halbig, Freiburg, Switzerland; vested in the Alien Property Custodian No Drawing. Application January 17, 1940, Serial No. 314,320. In Germany January 18, 1939

4 Claims. (Cl. 260—486)

The present invention has for its object the preparation of methacrylic-acid-esters from alpha-methyl-beta-hydroxy-propionic acid-ester by dehydration. It is true, the conversion of beta-oxy-carbon-acid-ester into alpha-beta-unsaturated acid-ester by dehydration is known. Thus acryl-ester may be prepared from beta-oxy-propionic-acid-ester. This reaction does not run smoothly in all the cases, compare in this connection Fittig, Liebig's Annalen der Chemie 28, page 60, last paragraph. Particularly the alpha-methyl-beta-hydroxy-propionic-acid-ester does not conform to the rule. E. G. it may be distilled undecomposed contrary to beta-oxy-propionic-acid-ester. By treatment with dehydrating agents such as phosphorus pentoxide, potassium bisulphate, zinc chloride, and the like, the methacrylic acid ester desired is obtained in limited quantity only, whilst the main quantity of the substance is converted into undefined, useless products. When treating ester with sulphuric acid, the main product is—apart from alcohol abstracted—a colourless, high boiling oil which does not admit of distillation in undecomposed condition so that the determination of its constitution presents difficulties. It probably represents a lactone. With this behaviour of alpha-methyl-beta-hydroxy-propionic-acid-ester there does not seem to be much chance of any technically useful yield being obtained by its conversion into methacrylic acid ester.

Now we have found that the dehydration in the direction desired takes a uniform course and methacrylic acid ester is obtained with a quantitatively practical yield by heating the alpha-methyl-beta-hydroxy-propionic-acid-ester to boiling point with catalytic quantities of alkali-metal salts of carboxylic acids and by distilling the water and the methacrylic acid ester forming itself during this process. E. G. the reaction may be carried through in such a manner that a small quantity of potassium acetate is dissolved in alpha-methyl-beta-hydroxy-propionic-acid-ester, and that this solution is heated to boiling point, while methacrylic acid ester and water is distilled, and fresh alpha-methyl-beta-hydroxy-propionic-acid-ester is added at the same time. So as to prevent the polymerization of the metacrylic acid ester, it is advisable to add to the boiling liquid and to the ester being added a small quantity of the anti-polymerization agents known to the art. In the present instance among others ferric salts have proved to be very useful for this purpose. The alkali-metal salts act purely catalytically. Secondary reactions occurring, if any at all, only to quite an insignificant degree, the alkali-metal salts are useful for conversion of very large quantities of ester.

For some time it has been possible to synthesize in a simple manner alpha-methyl-beta-hydroxy-propionic-acid-ester from propionic-acid-ester, carbon oxide and hydrogen, so that the method is of technical importance.

Example

A mixture of five parts of dehydrated potassium acetate and twenty parts of alpha-methyl-beta-hydroxy-propionic-acid-methyl-ester is heated to boiling point, the potassium acetate dissolving thereby. The temperature in the boiling liquid is kept at 185–190° C. by fractionating with the aid of a column the water and methacrylic acid ester forming itself. In counter-current to the vapors escaping through the column fresh alpha-methyl-beta-hydroxy-propionic-acid-ester is added to the boiling liquid, .1% of ferric chloride being dissolved in the former. Approximately 20–30 parts of methacrylic-acid-methyl-ester are obtained per hour. After separating the water the methacrylic acid ester is obtained in pure form and with a yield of 95% and more of the theory calculated on the converted alpha-methyl-beta-hydroxy-propionic-acid-ester. With this arrangement very large quantities of ester may be split without the catalyzer losing its efficacy. In the present instance e. g., 1000 parts of ester have been converted with the five parts of potassium acetate without there having been thereafter any reason for breaking off the reaction. To remove the potassium acetate the residue of distillation was shaken out with water, and in fractionating it yielded pure alpha-methyl-beta-hydroxy-propionic-acid-ester apart from small quantities of methacrylic acid ester without leaving any appreciable residue.

In quite a similar manner the reaction may be carried through by using alpha-methyl-beta-hydroxy-propionic-acid-ester of ethyl-alcohol, butyl alcohol, etc. Instead of potassium- or sodium-acetate also other carboxylic-acid salts may be used.

What we claim is:

1. Method for preparing methacrylic acid esters, characterized by splitting water from alpha-methyl-beta-hydroxy-propionic-acid-ester with the aid of carboxylic acid alkali-metal salts.

2. Method according to claim 1, characterized by heating alpha-methyl-beta-hydroxy-propionic-acid-ester in the presence of an alkali-metal salt of a carboxylic acid to boiling point and by distilling the methacrylic acid ester and water formed during this process.

3. Method according to claim 1, characterized by performing the splitting in presence of an anti-polymerization agent.

4. Process for producing methacrylic acid methyl ester which comprises heating alpha-methyl-beta-hydroxy-propionic acid methyl-ester to a temperature of 185–190° C. in the presence of an alkali-metal salt of a carboxylic acid, fractionating off the generated water and methacrylic acid ester, and simultaneously adding fresh alpha-methyl-beta-hydroxy-propionic acid methyl-ester to the boiling liquid.

LUDWIG BEER.
PAUL HALBIG.